United States Patent [19]

Tornero

[11] Patent Number: 5,570,874

[45] Date of Patent: Nov. 5, 1996

[54] FURNITURE SPRING ASSEMBLY WITH ELASTIC WEBBING

[75] Inventor: Roger Tornero, Greensboro, N.C.

[73] Assignee: Matrex Furniture Components, Inc., Greensboro, N.C.

[21] Appl. No.: 570,805

[22] Filed: Dec. 12, 1995

Related U.S. Application Data

[63] Continuation of Ser. No. 295,409, Aug. 25, 1994, abandoned.

[51] Int. Cl.⁶ .................................................. F16F 3/04
[52] U.S. Cl. .................. 267/95; 267/99; 267/100; 5/261; 5/264.1; 5/267; 297/452.5; 297/452.63; 29/896.92
[58] Field of Search .................. 267/33, 81, 89, 267/91, 94, 95, 99, 100, 110, 111, 112, 131, 133, 142, 143, 146, 130; 5/239, 243, 255, 252, 267, 261, 264.1, 478, 475, 480; 297/452.5, 452.63; 29/137, 896.42

[56] References Cited

U.S. PATENT DOCUMENTS

| | | | |
|---|---|---|---|
| 847,023 | 3/1907 | Ostrander | 267/100 |
| 1,815,510 | 7/1931 | Hotter | 5/267 |
| 1,899,726 | 2/1933 | Rusnak | 5/261 |
| 2,013,573 | 9/1935 | McNally | 5/267 |
| 2,042,763 | 6/1936 | Bernstein | 267/112 |
| 2,055,213 | 9/1936 | Bernstein | 267/112 |
| 4,928,334 | 5/1990 | Kita | 297/452.63 X |

OTHER PUBLICATIONS

Spring Assembly Drawing Aug. 25, 1994.

*Primary Examiner*—Lee Young

[57] ABSTRACT

A furniture seat spring assembly is presented which allows simplicity and economical seating for chairs, sofas or the like. The spring assembly comprises a U-shaped base having an eccentrically positioned coil spring which is covered with an elastic webbing. The eccentric position of the spring allows the user's weight to depress the webbing without "feeling" the coil spring which is positioned near the seat frame front rail. Multiple assemblies are positioned at selected intervals within conventional seat frames, depending on the particular frame size used.

13 Claims, 3 Drawing Sheets

FURNITURE SPRING ASSEMBLY WITH ELASTIC WEBBING

This is a continuation of application Ser. No. 08/295,409, filed 25 Aug. 1994, now abandoned.

BACKGROUND OF THE INVENTION

1. Field of the Invention

A "drop in" seat spring assembly is provided for use by furniture manufacturers in constructing frames for chairs, sofas, loveseats and other furniture. The spring assembly comprises an elongated U-shaped metal base to which is eccentrically attached a coil spring. Elastic webbing spans the U-shaped base to cover the coil spring and is releasably attached at each end thereof. The spring assembly is fastened to the front and rear rails of the furniture frames with the coil spring in a forward position, proximate the front rail.

2. Background and Objectives of the Invention

Quality crafted chairs, sofas and other fine furniture have been constructed almost exclusively through the years with metal coil spring assemblies. Such assemblies generally utilize a metal frame and grid to which are attached a number of coil springs which are tied together at their upper ends. Such spring assemblies are positioned in seat frames and are covered with padding material, and include various types of cloth, leather or vinyl coverings. Such seating constructions are generally very durable and are initially comfortable but after extensive use and with the passage of time, the springs can become loose and can be felt while sitting. Such spring assemblies are generally difficult to repair and are heavy and awkward to handle during the furniture manufacturing. Furniture can be made in a less expensive fashion by the use of sinuous metal spring assemblies and for cost reasons, some furniture manufacturers have eliminated metal springs entirely and have relied on resilient polyurethane foam cushions to provide a resiliency. However, purchasers of quality furniture demand the feel and durability of coil springs. Thus, many furniture manufacturers still supply the public with furniture having the old, heavy metal coil spring assemblies therein.

In order to overcome the problems faced by furniture manufacturers, the present invention was conceived and one of its objectives is to provide a furniture seat frame spring assembly which will allow seating as comfortable as conventional coil spring assemblies but at a far more economical price.

It is another objective of the present invention to provide a spring assembly which utilizes a single coil spring with elastic webbing which is as effective and comfortable as the multiple spring assemblies of the older types.

It is still another objective of the present invention to provide a coil spring assembly which can be used in multiples in any of a variety of different types or sizes of furniture.

It is also an objective of the present invention to provide a furniture spring assembly which includes a U-shaped metal base for supporting an eccentrically positioned coil spring which is covered with releasably affixed elastic webbing.

Various other objectives and advantages of the present invention will become apparent to those skilled in the art as a more detailed description of the invention is set forth below.

SUMMARY OF THE INVENTION

The aforesaid and other objectives are realized by providing a spring assembly utilizing a conventional U-shaped metal base to which a single coil spring is eccentrically affixed. For a typical chair seat frame, two such spring assemblies would be provided for sufficient support. Each spring assembly includes a coil spring, affixed to the base, which extends upwardly, and atop the spring is positioned narrow elastic webbing which is releasably attached at both ends to the base. The elastic webbing may consist of a textile fabric with elastomeric yarns and includes a pair of conventional hooks at each end which are received by apertures at each end of the metal U-shaped base. The coil spring is mounted eccentrically, i.e. along the forward portion of the base whereby normal body weight during sitting is not directed onto the coil spring, but somewhat rearwardly thereof. By so positioning the coil spring along the base a very comfortable feel is obtained since the elastic webbing provides initial resiliency or load resistance and thereafter, as the elastic webbing is further depressed, the coil spring provides secondary resistance or resiliency to the user's body weight.

DETAILED DESCRIPTION OF THE PREFERRED EMBODIMENT

Figure 1:
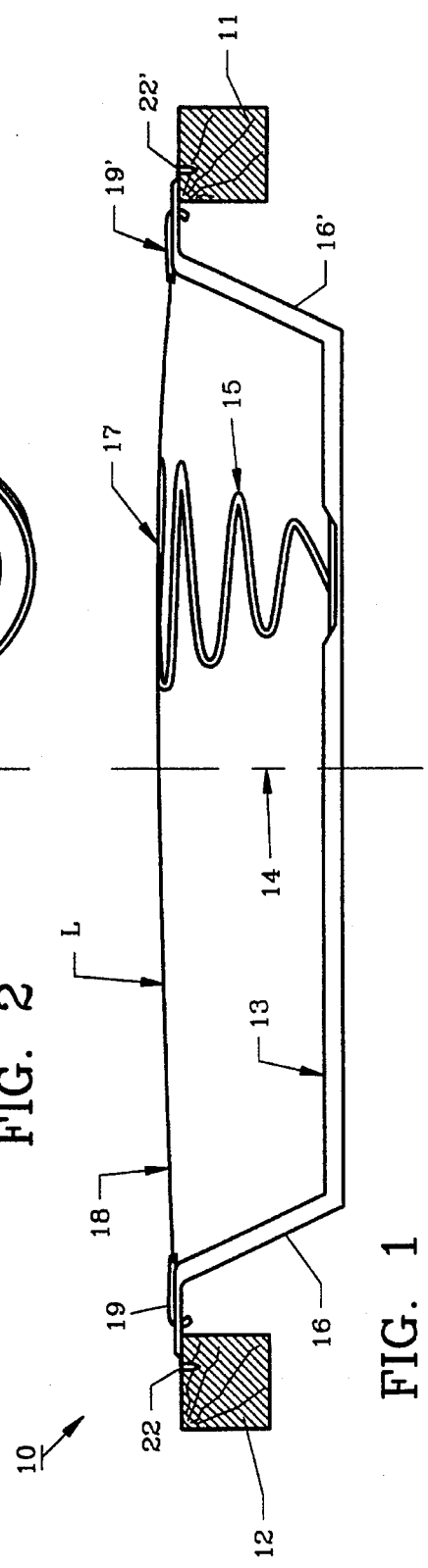
FIG. 1 illustrates a side sectional view of a spring assembly of the invention as positioned on front and rear rails of a furniture seat frame.
Figure 2:
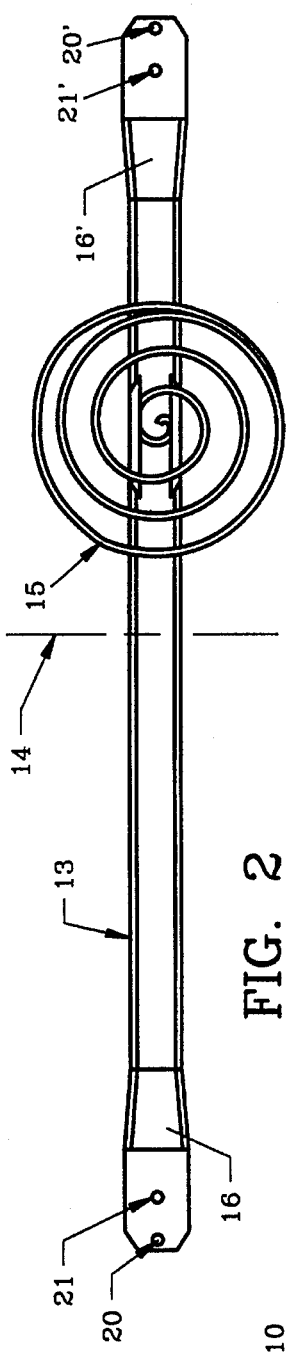
FIG. 2 demonstrates a top view of the base of the spring assembly as shown in FIG. 1 with the coil spring eccentrically mounted thereon but with the elastic webbing removed.
Figure 3:
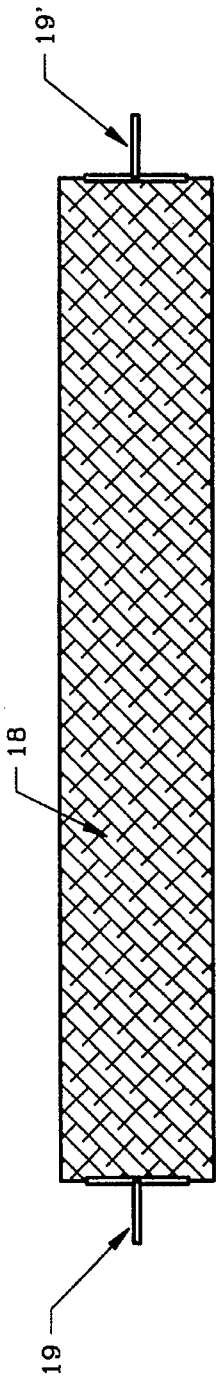
FIG. 3 shows a top view of the elastic webbing as seen in FIG. 1.

The preferred form of the invention is shown in FIG. 1 whereby spring assembly 10 is seen in a side view with metal base 13 affixed to conventional wooden seat furniture frame front rail 11 and rear rail 12. Spring assembly 10 includes metal U-shaped base 13 as formed from steel having a longitudinal midpoint at 14 and with conventional coil spring 15 mounted at its lower end to base 13 by folded tabs. Coil spring 15 can also be attached at its lower end to base 13 such as by welding, bolting or the like. As further seen, coil spring 15 extends upwardly therefrom slightly higher than base sides 16, 16' to form a slight crown 17 as it contacts elastic webbing 18. Elastic webbing 18 consists of a longitudinally stretchable narrow elastomeric fabric which contains rubber, elastic or spandex yarns as are conventional and well known in the textile trade. Affixed at each end of elastic webbing 18 are metal hooks 19' 19' for releasable attachment of webbing 18 to base 13. As further shown in FIG. 2, elongated base 13 includes apertures 20, 20' for receiving screws, 22, 22' as shown in FIG. 1 for affixing assembly 10 to rails 12, 11 respectively. Elongated base 13 also includes apertures 21, 21' for receiving respectively hooks 19, 19', as also shown in FIG. 1. In FIG. 2, elastic webbing 18 has been removed from base 13 and as further shown, midpoint 14 of elongated base 13 clearly illustrates the eccentric positioning of spring 15 as coil 15 is mounted approximately half-way between midpoint 14 and front vertical side 16' of elongated base 13.

In a typical installation, a rectangular furniture seat frame would have a space of approximately 61 cm between the front and rear rails whereas apertures 20, 20' would be spaced with 58 ½ cm centers. Coil spring 15 may have a maximum diameter of approximately 13 cm and vertical sides 16, 16' of elongated base 13 a height of approximately seven and one-half (7½) cms. By placing coil spring 15 approximately one-quarter of the distance along base 13 (between midpoint 14 and front vertical side 16') a superior seating "feel" is achieved for those using the chair or other seat containing spring assemblies 10. As the load (body weight) is initially at the rearward portion of a chair seat (towards the rear rail, as seen at "L") spring 15 provides only slight resistance to load L as shown in FIG. 1 and elastic webbing 18 provides most of the initial support or resistance. By placing spring 15 eccentrically (forward) on base 13 shown in FIG. 1, a soft, luxurious feel is achieved without a "mushy" sensation as spring 15 provides secondary resistance to load L.

Figure 4:
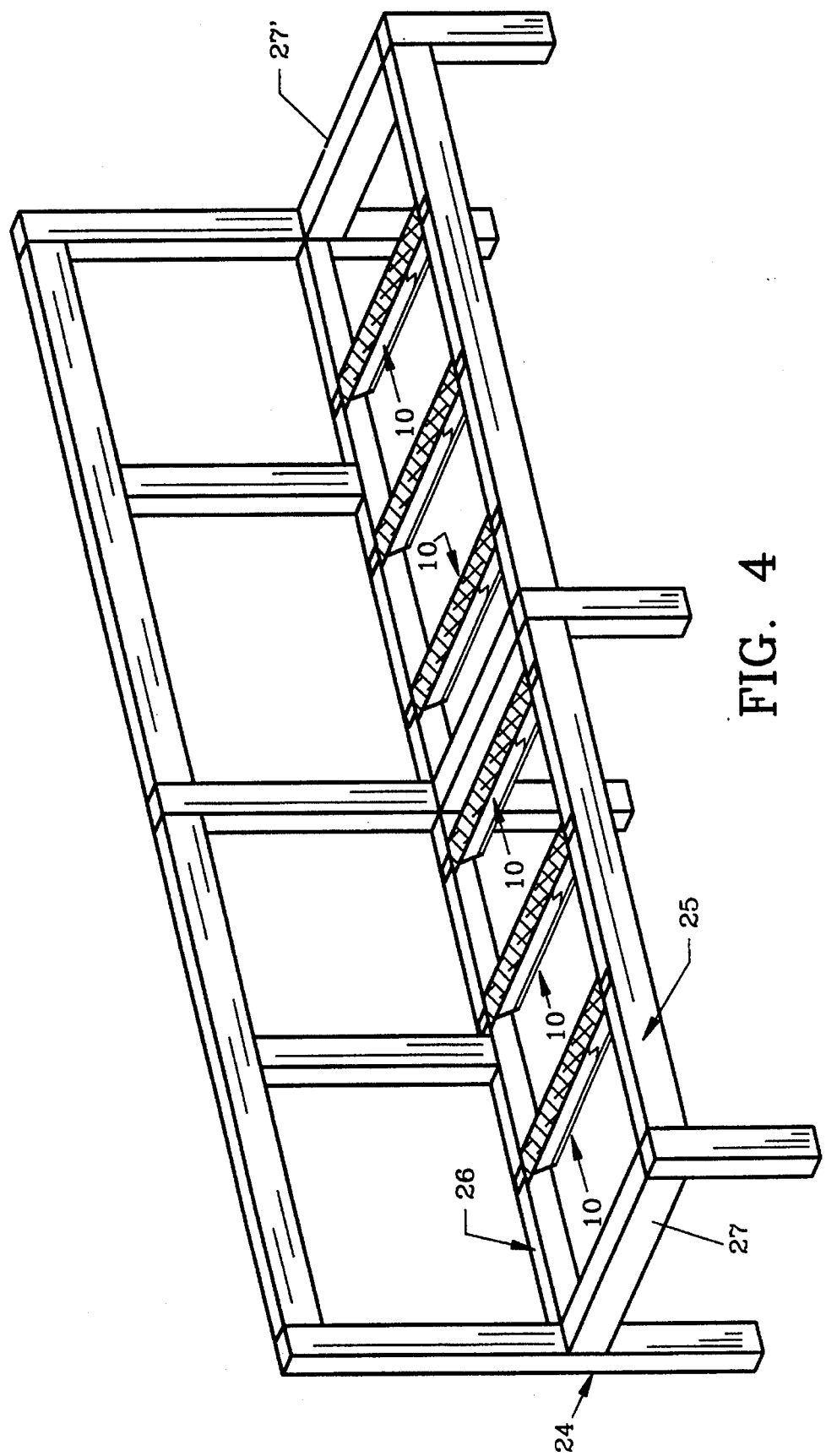
FIG. 4 pictures a perspective view of a conventional 3-seat wooden sofa frame with a plurality of spring assemblies positioned thereon before upholstering begins.

A preferred use of furniture spring assembly 10 is shown in FIG. 4 whereby six such spring assemblies 10 are positioned between sofa seat frame front rails 25 and rear rails 26. Sofa seat frame 24 also includes side rails 27, 27' and as would be understood, other size sofa frames, chairs or the like can utilize spring assembly 10. A conventional chair may contain only two (2) spring assemblies 10 whereas a larger sofa frame, may employ ten or more spring assemblies 10 as required.

Figure 5:
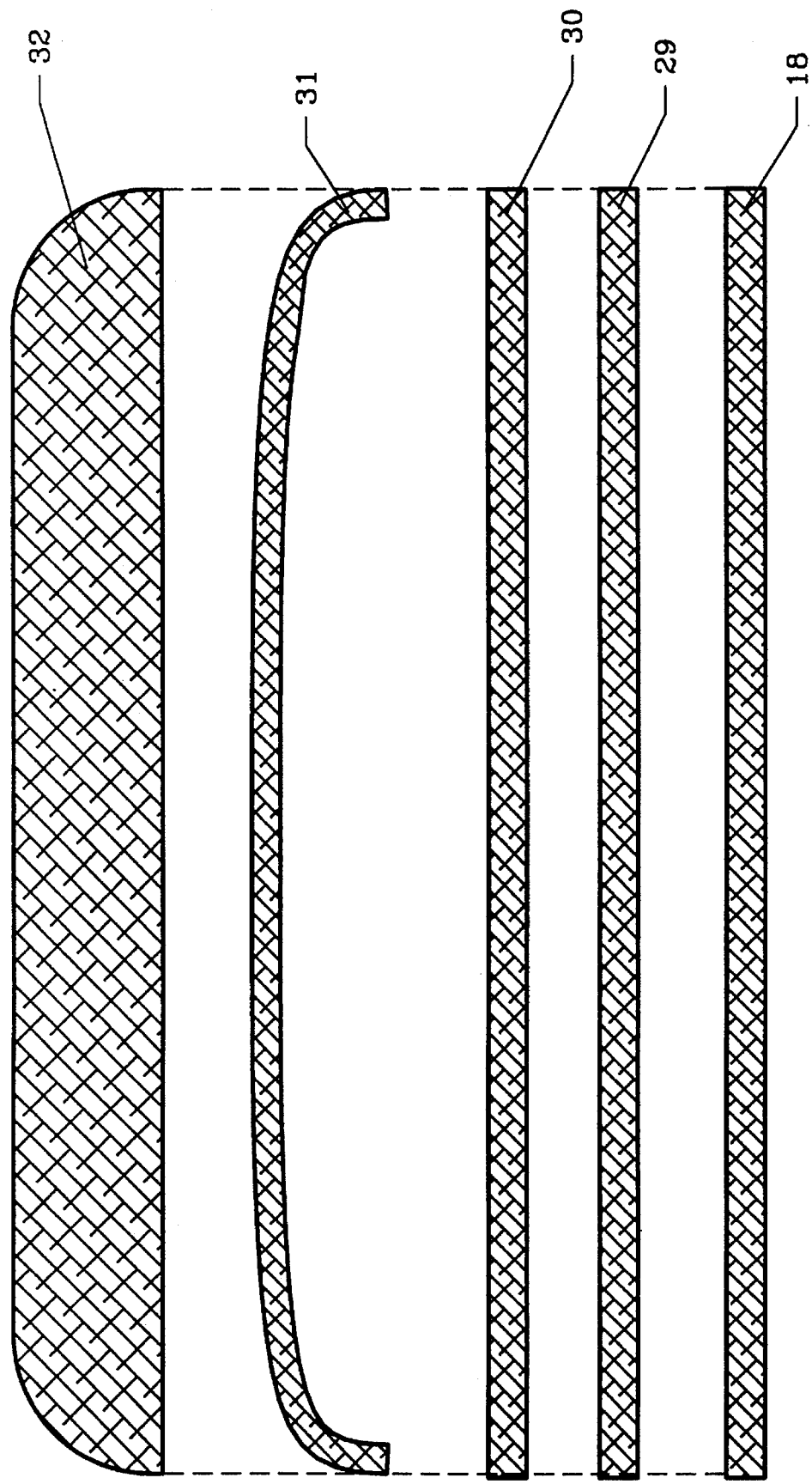
FIG. 5 shows additional upholstery coverings for the spring assembly.

In FIG. 5 additional components of typical furniture frame coverings are shown. Atop elastic webbing 18, for example a non-woven cloth 29 of polypropylene yarn may be placed which extends from side rails 27, to 27' as shown in FIG. 4. Pad 30, conventionally called a "shoddy" pad which may be for example one-half inch thick and formed of non-woven or needle punched material is placed atop non-woven cloth 29. On top of shoddy pad 30 conventional decking fabric 31 is affixed to support upholstered polyurethane cushions 32. Other combinations, fabric types and materials could likewise be used with furniture assembly 10 as desired and conventionally affixed in secure fashion.

The illustrations and examples provided herein are for explanatory purposes and are not intended to limit the scope of the appended claims.

I claim:

1. A furniture spring assembly for attachment between a front rail and a rear rail of a furniture frame, consisting of:
   (a) an elongated base, said elongated base adapted to be attached to said front and rear rails;
   (b) a spring, said spring mounted eccentrically on said base forward of the midpoint of said base; and
   (c) elastic webbing, said elastic webbing attached at each end of said elongated base by connectors and positioned over said spring.

2. The furniture spring assembly as claimed in claim 1 wherein said elongated base is U-shaped.

3. The furniture spring assembly as claimed in claim 1 wherein said spring comprises a coil spring.

4. The furniture spring assembly as claimed in claim 1 wherein said elastic webbing is longitudinally stretchable and comprises elastic yarns.

5. The furniture spring assembly as claimed in claim 1 wherein said elastic webbing is releasably attached to said base.

6. The furniture spring assembly as claimed in claim 1 wherein said connectors comprise hooks, said elongated base defining hook openings, said hook openings for receiving said hooks.

7. Furniture construction comprising: a rectangular seat frame, said seat frame having a front rail, side rails, and a rear rail, said side rails joined to said front and to said rear rails, a spring assembly, said spring assembly attached to said seat frame, said spring assembly consisting of:
   (a) an elongated base, said elongated base attached to said front rail and said rear rail,
   (b) a spring mounted eccentrically on said base forward of the midpoint thereof,
   (c) elastic webbing, said webbing attached to each end of said elongated base by connectors and over said spring.

8. Furniture construction of claim 7 wherein said connectors comprise hooks, said hooks for releasable attachment to said elongated base.

9. Furniture construction of claim 7 wherein said elongated base is U-shaped.

10. Furniture construction of claim 7 wherein said spring comprises a coil spring.

11. Furniture construction of claim 7 wherein said elastic webbing is longitudinally stretchable and comprises elastic yarns.

12. Furniture construction of claim 7 wherein said connectors comprise hooks, said elongated base defines hook openings, said hook openings for receiving said hooks.

13. A method of constructing a furniture spring in a seat frame having front and rear rails, consisting of the following steps:
   (a) positioning an elongated base between said front and rear rails;
   (b) mounting a spring eccentrically on said base forward of the midpoint thereof; and
   (c) attaching an elastic webbing to each end of said elongated base by connectors over said spring.

* * * * *